(12) United States Patent
Koutrokois (10) Patent No.: US 9,857,545 B2
(45) Date of Patent: Jan. 2, 2018

(54) LATCH MECHANISM FOR COMMUNICATION MODULE

(71) Applicant: FINISAR CORPORATION, Sunnyvale, CA (US)

(72) Inventor: Demetrios Koutrokois, San Francisco, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/868,314

(22) Filed: Sep. 28, 2015

(65) Prior Publication Data

US 2016/0274322 A1 Sep. 22, 2016

Related U.S. Application Data (63) Continuation of application No. 13/652,254, filed on Oct. 15, 2012, now Pat. No. 9,146,366.

(51) Int. Cl.
| | |
|---|---|
| *H05K 5/00* | (2006.01) |
| *G02B 6/42* | (2006.01) |
| *F16B 21/12* | (2006.01) |
| *G02B 6/38* | (2006.01) |

(52) U.S. Cl.
CPC .......... *G02B 6/4292* (2013.01); *F16B 21/125* (2013.01); *G02B 6/389* (2013.01); *G02B 6/3825* (2013.01); *G02B 6/4246* (2013.01); *G02B 6/4261* (2013.01); *G02B 6/4277* (2013.01); *Y10T 403/60* (2015.01)

(58) Field of Classification Search
None
See application file for complete search history.

(56) References Cited

U.S. PATENT DOCUMENTS

| | | | | |
|---|---|---|---|---|
| 6,538,882 B2* | 3/2003 | Branch | ............ | H01R 13/6275 361/679.02 |
| 6,560,114 B2* | 5/2003 | Berry | ............ | H05K 7/1489 312/223.2 |
| 6,749,448 B2* | 6/2004 | Bright | ............ | G02B 6/4201 439/152 |
| 6,839,237 B2* | 1/2005 | Berry | ............ | H05K 7/1489 312/223.2 |

(Continued)

OTHER PUBLICATIONS

Extended European Search Report dated Dec. 22, 2016 for European Application No. 13846813.7 filed Oct. 15, 2013.

*Primary Examiner* — Courtney Smith
*Assistant Examiner* — Rashen E Morrison
(74) *Attorney, Agent, or Firm* — Maschoff Brennan (57) ABSTRACT

Latch mechanism for communication modules. In an example embodiment, a module latch mechanism includes a follower configured to be slidingly positioned relative to a housing and a driver configured to be rotatingly positioned relative to the housing. The follower includes a first arm configured to facilitate selective engagement of the housing with a host device. The follower may further include a fastening mechanism configured to facilitate selective engagement of the follower with the housing. The driver is configured to be positioned relative to the follower such that the driver urges the follower toward a first position relative to the housing as the driver is rotated from an unlatched position to a latched position.

21 Claims, 10 Drawing Sheets

(56) References Cited

U.S. PATENT DOCUMENTS

| | | | |
|---|---|---|---|
| 6,887,092 B2* | 5/2005 | Minota | H01R 13/62933 |
| | | | 439/160 |
| 6,991,481 B1* | 1/2006 | Guan | G02B 6/3897 |
| | | | 439/160 |
| 7,027,293 B2* | 4/2006 | Yang | H02B 1/205 |
| | | | 200/50.27 |
| 7,201,520 B2* | 4/2007 | Mizue | G02B 6/4292 |
| | | | 385/92 |
| 7,517,160 B2* | 4/2009 | Miyoshi | G02B 6/4261 |
| | | | 385/53 |
| 2002/0093796 A1 | 7/2002 | Medina | |
| 2003/0142917 A1* | 7/2003 | Merrick | G02B 6/4201 |
| | | | 385/53 |
| 2004/0033027 A1* | 2/2004 | Pang | G02B 6/3825 |
| | | | 385/53 |
| 2004/0233643 A1* | 11/2004 | Bolich | G06F 1/184 |
| | | | 361/727 |
| 2004/0235332 A1* | 11/2004 | Ice | G02B 6/4201 |
| | | | 439/352 |
| 2005/0018979 A1 | 1/2005 | Mizue et al. | |
| 2005/0257232 A1* | 11/2005 | Hidaka | G11B 33/126 |
| | | | 720/654 |
| 2006/0078259 A1* | 4/2006 | Fuchs | G02B 6/4201 |
| | | | 385/88 |
| 2010/0112846 A1 | 5/2010 | Kotaka | |

* cited by examiner

LATCH MECHANISM FOR COMMUNICATION MODULE

CROSS-REFERENCE TO RELATED APPLICATIONS

This application is a continuation of U.S. patent application Ser. No. 13/652,254, filed Oct. 15, 2012, titled LATCH MECHANISM FOR COMMUNICATION MODULE, which is incorporated herein by reference in its entirety.

BACKGROUND

Field

The embodiments discussed herein relate generally to communication modules. More particularly, example embodiments relate to latch mechanisms for selectively engaging communication modules with a housing of a host device.

Relevant Technology

Communication modules, such as electronic or optoelectronic transceiver or transponder modules, are increasingly used in electronic and optoelectronic communication. Some modules are pluggable, which permits the module to be inserted into and removed from a housing of a host device, such as a host computer, switching hub, network router, or switch box. Latching mechanisms within the housing of the host device may be made to physically secure an inserted communication module into place. To remove the communication module, the latching mechanism may be manipulated to physically unsecure the communication module.

The subject matter claimed herein is not limited to embodiments that solve any disadvantages or that operate only in environments such as those described above. Rather, this background is only provided to illustrate one exemplary technology area where some embodiments described herein may be practiced

SUMMARY

These and other limitations are overcome by embodiments of the invention which relate to systems and methods for selectively engaging communication modules with a housing of a host device.

This Summary is provided to introduce a selection of concepts in a simplified form that are further described below in the Description of Embodiments. This Summary is not intended to identify key features or essential characteristics of the claimed subject matter, nor is it intended to be used as an aid in determining the scope of the claimed subject matter.

In an example embodiment, a module latch mechanism includes a follower and a driver. The follower is configured to be slidingly positioned relative to a housing. The driver is configured to be rotatingly positioned relative to the housing. The follower includes a first arm configured to facilitate selective engagement of the housing with a host device. The follower may further include a fastening mechanism configured to facilitate selective engagement of the follower with the housing. The driver is configured to be positioned relative to the follower such that the driver urges the follower toward a first position relative to the housing as the driver is rotated from an unlatched position to a latched position.

In another example embodiment, a module includes a housing and a module latch mechanism. The housing includes at least one electromagnetic interference (EMI) protrusion configured to contact at least a portion of an EMI shield located on a host device. The module latch mechanism includes a follower and a driver. The follower is configured to be slidingly positioned relative to the housing. The follower includes a pair of arms configured to facilitate selective engagement of the housing with the host device at least in part by way of temporary deformation of structure of the host device. The follower is further configured to be positioned at least partially around the at least one EMI protrusion. The driver is configured to be rotatingly positioned relative to the housing. The driver is further configured to be positioned relative to the follower such that the driver urges the follower toward a first position relative to the housing as the driver is rotated from an unlatched position to a latched position, and urges the follower toward a second position relative to the housing as the driver is rotated from the latched position to the unlatched position.

In yet another example embodiment, a module includes a housing and a module latch mechanism. The module latch mechanism includes a follower and a driver. The follower is configured to be slidingly positioned relative to the housing. The follower includes a pair of arms configured to facilitate selective engagement of the housing with a host device at least in part by way of temporary deformation of structure of the host device. The follower also includes a fastening mechanism including a first portion of a resilient fastener configured to selectively engage a second portion of the resilient fastener positioned on the housing. The fastening mechanism may be configured to urge the latch mechanism toward a first position when the housing is engaged with the host device. The driver is configured to be rotatingly positioned relative to the housing. The driver is further configured to be positioned relative to the follower such that the driver urges the follower toward a first position relative to the housing as the driver is rotated from an unlatched position to a latched position, and urges the follower toward a second position relative to the housing as the driver is rotated from the latched position to the unlatched position.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are, therefore, not to be considered limiting of its scope. The invention will be described and explained with additional specificity and detail through the use of the accompanying drawings in which.

DESCRIPTION OF EMBODIMENTS

Example embodiments relate to latch mechanisms for selectively engaging communication modules with host devices. Example embodiments also relate to communication modules that include latch mechanisms for selectively engaging the communication modules with host devices. Embodiments described herein may include fewer and/or less complex parts, and may allow for simplified assembly compared to traditional latch mechanisms. In addition, embodiments of the latch mechanism described herein may eliminate the need for rivets, which may reduce the space required by the latch mechanism compared to the traditional latch mechanisms that employ rivets. For at least these reasons, embodiments of the latch mechanism may be less expensive and/or less expensive to implement, and may result in communication modules with more available space for communication components than traditional latch mechanisms.

Furthermore, compared to traditional latch mechanisms, embodiments of latch mechanisms described herein may exhibit little or no tactile dead zones in the travel of the latch mechanism. Some embodiments of latch mechanisms described herein may further include a resilient member configured to urge the latch mechanisms into a latched position when the latch mechanism is not in use. As a result, embodiments described herein may exhibit an improved tactile feel and may promote a decrease in undesirable occurrences of communication modules being inadvertently left unlatched from the host device.

Some example embodiments of the latch mechanisms and communication modules disclosed herein further increase contact between housing of the communication modules and electromagnetic interference (EMI) shields of the host devices. Embodiments described herein may allow the EMI shield of the host device to contact the housing of the communication module in locations where traditional latch mechanisms would not allow such contact. For at least these reasons, some embodiments of the latch mechanisms may reduce EMI leakage from the host devices and/or may improve the EMI performance of communication modules.

Reference will now be made to the drawings wherein like structures will be provided with like reference designations. It should be understood that the drawings are diagrammatic and schematic representations of example embodiments and, accordingly, are not limiting of the scope of the present invention, nor are the drawings necessarily drawn to scale. It should also be understood that many of the features of the disclosed embodiments may be substantially symmetrical and a pluralized reference to a feature may refer to a pair of similar features of which only one may be labeled in the drawings.

1. Example Host Device and Communications Module

Figure 1:
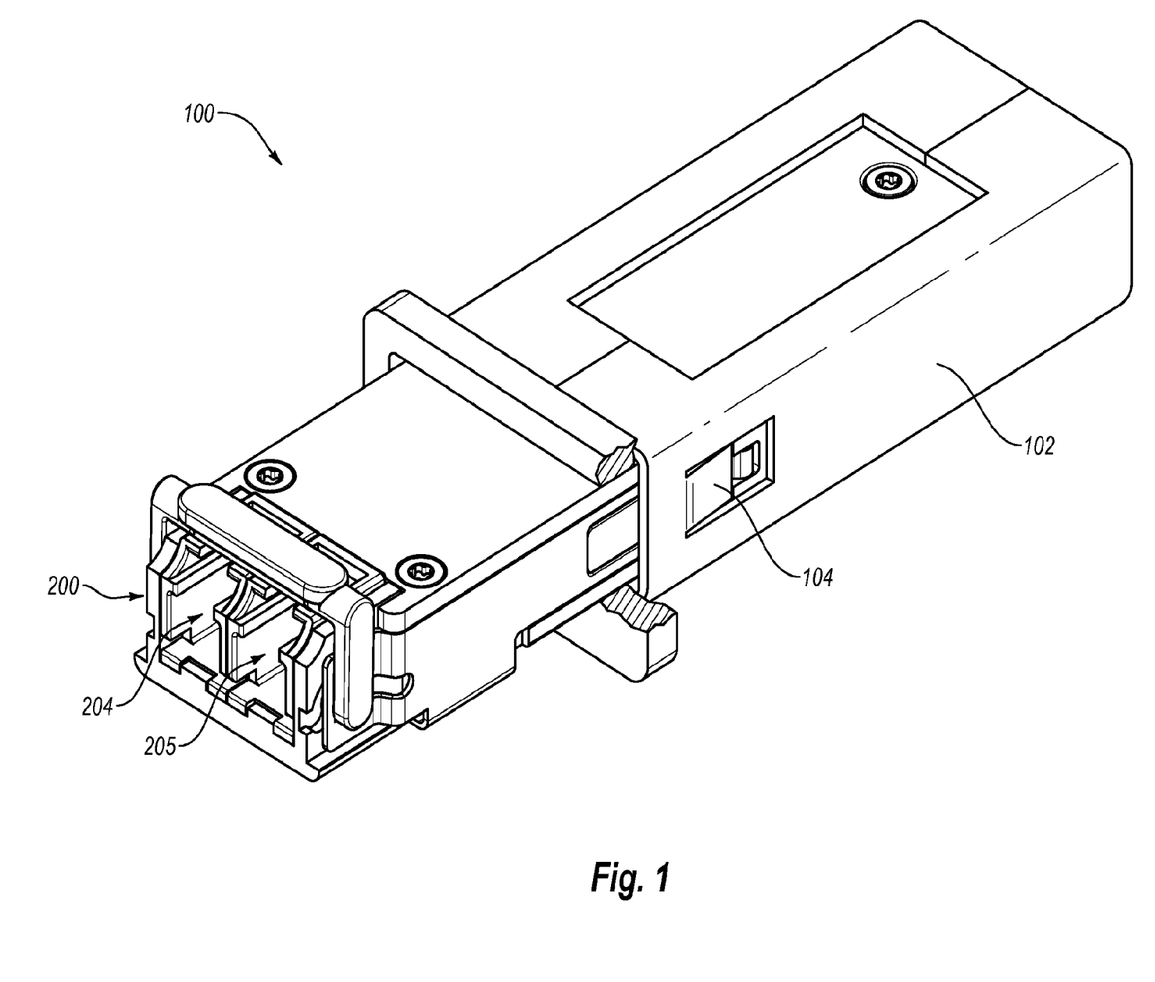
FIG. 1 is a partially cutaway top perspective view of portions of an example host device with an example optoelectronic module in a latched configuration located inside the example host device.

FIG. 1 is a partial cutaway top perspective view of portions of an example host device 100 with an example optoelectronic module 200 in a latched configuration located inside the example host device 100. In general, the optoelectronic module 200 may be employed in the communication of optical signals and the conversion of optical signals to and from electrical signals. In connection, the host device 100 may be employed in the communication of corresponding electrical signals.

The optoelectronic module 200 may include a transmit port 204 and a receive port 205 at a front of the optoelectronic module 200. The optoelectronic module 200 can be configured for optical signal transmission and reception via the transmit port 204 and the receive port 205 at a variety of data rates including, but not limited to, 1.25 Gb/s, 2.125 Gb/s, 2.5 Gb/s, 4.25 Gb/s, 8.5 Gb/s, 10.3 Gb/s, 10.5 Gb/s, 11.3 Gb/s, 14.025 Gb/s, or 100 Gb/s or higher. Furthermore, the optoelectronic module 200 can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the optoelectronic module 200 can be configured to support various communication protocols including, but not limited to, Optical Fast Ethernet, Optical Gigabit Ethernet, 10 Gigabit Ethernet, and 1×, 2×, 4×, 8×, and 16× Fibre Channel. In addition, although one example of the optoelectronic module 200 is configured to have a form factor that is substantially compliant with the XFP MSA, the optoelectronic module 200 can alternatively be configured in a variety of different form factors that are substantially compliant with other MSAs including, but not limited to, the QSFP MSA, the QSFP+ MSA, the CFP MSA, the CFP2 MSA, the CFP4 MSA, the SFP MSA, or the SFP+ MSA. Finally, although the optoelectronic module 200 is illustrated as a pluggable optoelectronic transceiver module, example embodiments of the latching mechanism disclosed herein can alternatively be employed, for example, in connection with pluggable electronic transceiver modules, other pluggable electronic devices such as pluggable media drives, or the like.

The host device 100 may include a cage 102 configured to be connected to a host printed circuit board (not shown). The cage 102 is configured to at least partially receive the optoelectronic module 200. The cage 102 includes a pair of inwardly-biased leaf springs 104 located on opposite sides of the cage 102. Although the leaf springs 104 are inwardly biased, the leaf springs 104 do not substantially impede the insertion of the optoelectronic module 200 into the host device cage. The leaf springs 104 extend away from the front of the cage 102 where the optoelectronic module 200 is at least partially received. The host device 100 generally forms an electrical connection to the optoelectronic module 200 through which electrical signals may be communicated between the host device 100 and the optoelectronic module 200.

Figure 2:
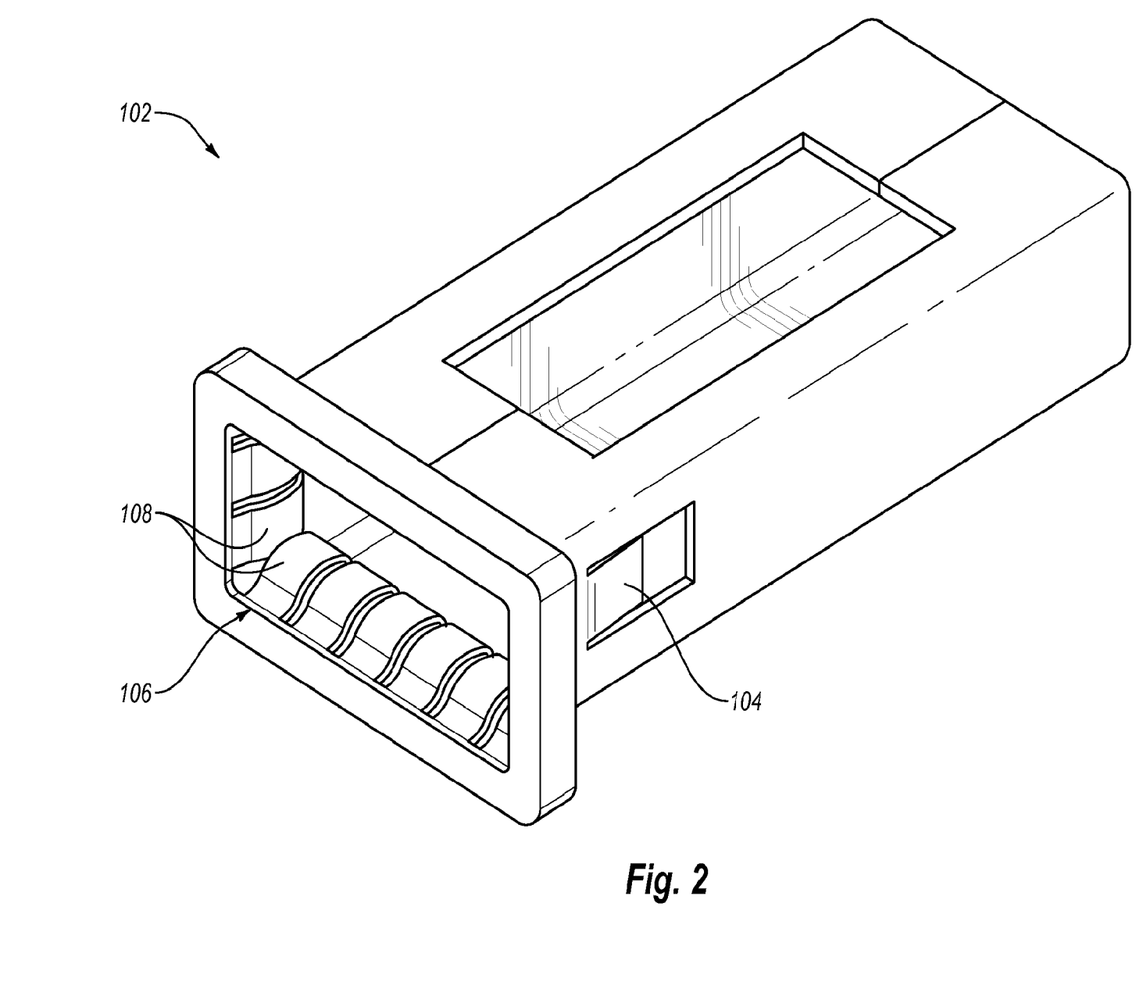
FIG. 2 is a top perspective view of the host device cage of FIG. 1, with the optoelectronic module omitted.

FIG. 2 is a top perspective view of the host device 100 cage 102 of FIG. 1, with the optoelectronic module 200 omitted. As illustrated in FIG. 2, the cage 102 may include an EMI shield 106. In some embodiments, the EMI shield 106 includes multiple EMI fingers 108. The EMI fingers 108 may be inwardly biased to improve contact with an optoelectronic module inserted into the cage 102. Although inwardly biased, the EMI fingers 108 do not substantially impede the insertion of an optoelectronic module into the cage 102. The EMI shield 106 may generally be configured to reduce levels of EMI radiation allowed to leak from the cage 102. In some instances, the levels of EMI radiation allowed to leak from the cage 102 may be defined by communication standards or the like. Generally, effective EMI shielding may decrease the levels of interference experienced between modules and thus may improve performance of the modules.

Figure 3A:
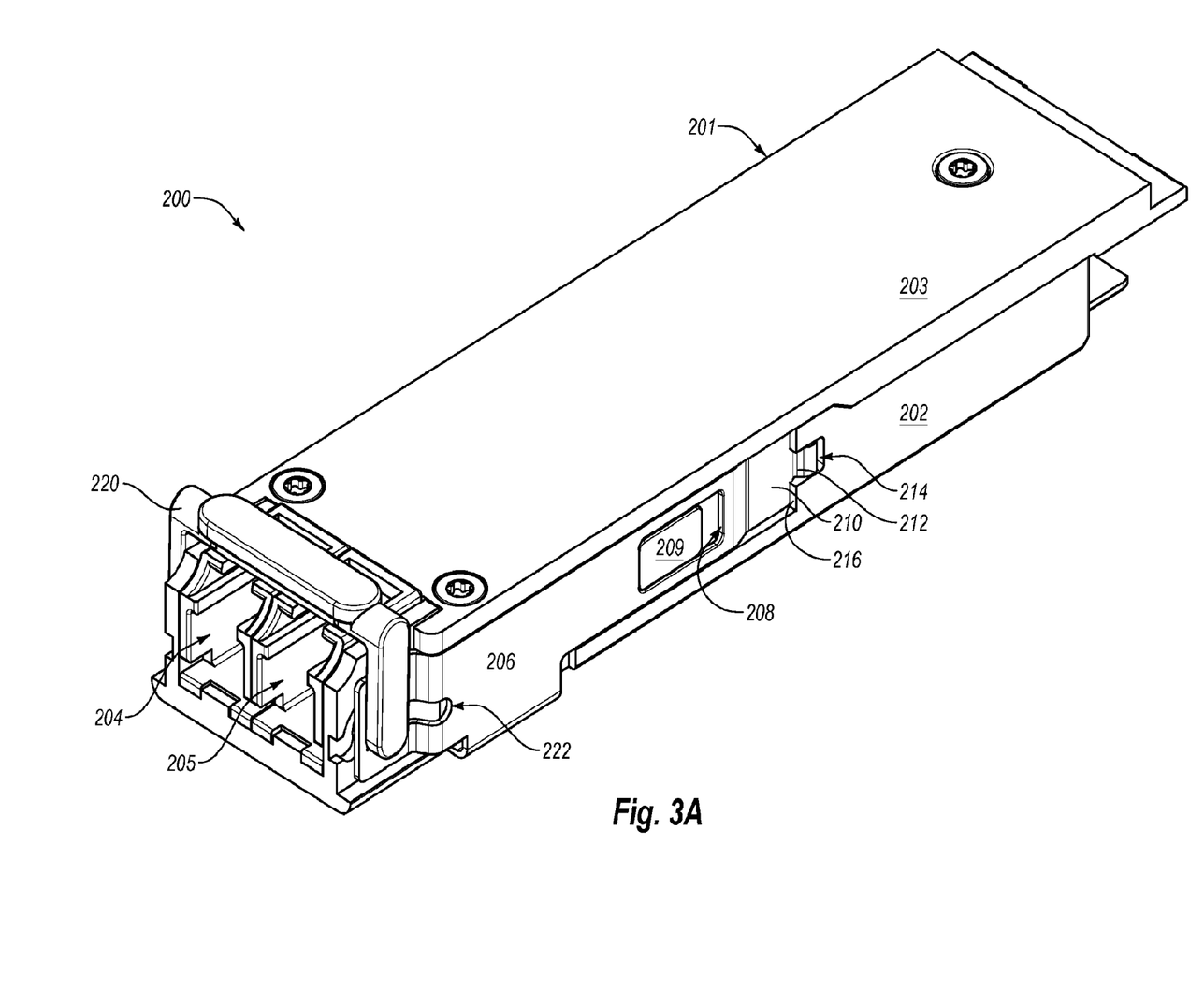
FIG. 3A is a top perspective view of the example optoelectronic module of FIG. 1 in the latched configuration with the example host device omitted.

FIG. 3A is a top perspective view of the example optoelectronic module 200 of FIG. 1 in the latched position with the example host device omitted. The example optoelectronic module 200 includes a housing 201 that may include a bottom housing 202 and a top housing 203. The housing 201 may at least partially surround receiver and/or transmitter circuitry (not shown), including a printed circuit board having an edge connector (not shown) configured to be electrically coupled to the host device. The bottom housing 202 and/or the top housing 203 may be die cast in zinc. Alternately or additionally, the bottom housing 202 and/or the top housing 203 may be die cast, or otherwise manufactured, from other suitable materials or a combination of other suitable materials.

2. Example Latching Mechanism

As disclosed in FIG. 3A, the optoelectronic module 200 includes a driver 220 and a follower 206. The driver 220 and the follower 206 may be formed in various ways, including, but not limited to, being stamped from metal or molded from hard plastic.

The follower 206 is configured to be slidingly positioned relative to the housing 201. The follower 206 is shown in a first position relative to the housing 201. In the disclosed embodiment, the follower 206 includes a pair of follower arms on opposite sides of the housing 201. The follower arms include recesses 210. The recesses 210 and the housing 201 are configured such that the leaf springs of the host device cage (as disclosed in FIG. 1) may fit at least partially within the recesses 210 when the optoelectronic module 200 is in the latched configuration.

The bottom housing 202 includes shoulders 216 adjacent to the recesses 210. The shoulders 216 are configured to at least partially abut the leaf springs when the leaf springs are within the recess 210. When the optoelectronic module 200 is in the latched configuration, as shown in FIG. 3A, the engagement of the shoulders 216 and the leaf springs act to prevent the optoelectronic module 200 from moving significantly within a host device cage. As a result, the electrical connection between the optoelectronic module 200 and the host device may be maintained and unintentional disconnection can be reduced and potentially eliminated.

As shown, in some embodiments, the fingers 214 may include EMI windows 208. The EMI windows 208 may allow EMI protrusions 209 on the housing 201 to make contact with the EMI shield 106 of the host device cage (shown in FIG. 2). Although the EMI windows 208 are shown as being located completely within the follower arms, the EMI windows 208 may alternately or additionally be located at the top and/or bottom edges of the follower arms. Furthermore, as disclosed in FIG. 3A, the EMI windows 208 and EMI protrusions 209 may be shaped such that the follower 206 can slide relative to the housing 201 as the driver 220 is rotated between the latched position (as shown in FIGS. 1, 3A and 3C) and the unlatched position (as shown in FIGS. 3D and 3E), described in additional detail below.

Increased contact between the housing 201 and the EMI shield of the host device cage by way of the EMI protrusions 209 may improve EMI shielding. Electromagnetic interference leaked from the host cage may be reduced and EMI performance of the optoelectronic module 200 and nearby modules (not shown) may be improved compared to modules that do not facilitate contact between the housing 201 and the EMI shield of the host device cage near the follower arms. For example, traditional latch mechanisms may include follower arms interposed between the module housing and the EMI shield such that the EMI shield makes little or no contact with the sides of the module housing. In some embodiments, the follower 206 and the housing 201, including the EMI protrusions 209, are configured such that the EMI shield makes contact with only the housing 201 and not the follower 206.

Although illustrated embodiments increase contact between the EMI shield and the housing 201 by way of a pair of EMI protrusions 209 and a corresponding pair of EMI windows 208, other configurations may be used. For example, in some embodiments, additional EMI protrusions 209 may be used with additional EMI windows 208. Alternately or additionally, the shape of the follower 206 and the shape of the housing 201 may be configured such that the contact between the EMI shield and the housing 201 is increased. For example, the follower arms may include a thin section that fits within a trough formed in the housing 201. In some embodiments, the housing 201 and the follower 206 may be configured based on an expected configuration of the EMI shield.

The follower arms may include fingers 214 that extend beyond the shoulders 216 when the optoelectronic module 200 is in the latched configuration. The fingers 214 may include ramped surfaces 212. When the optoelectronic module 200 is moved from a latched configuration to an unlatched configuration, the fingers 214 and ramped surfaces 212 act to move the leaf springs such that the optoelectronic module 200 may be removed from the host device cage. Moving the optoelectronic module 200 from a latched configuration to an unlatched configuration is generally accomplished when the driver 220 is rotated from a latched position to an unlatched position.

Figure 3B:
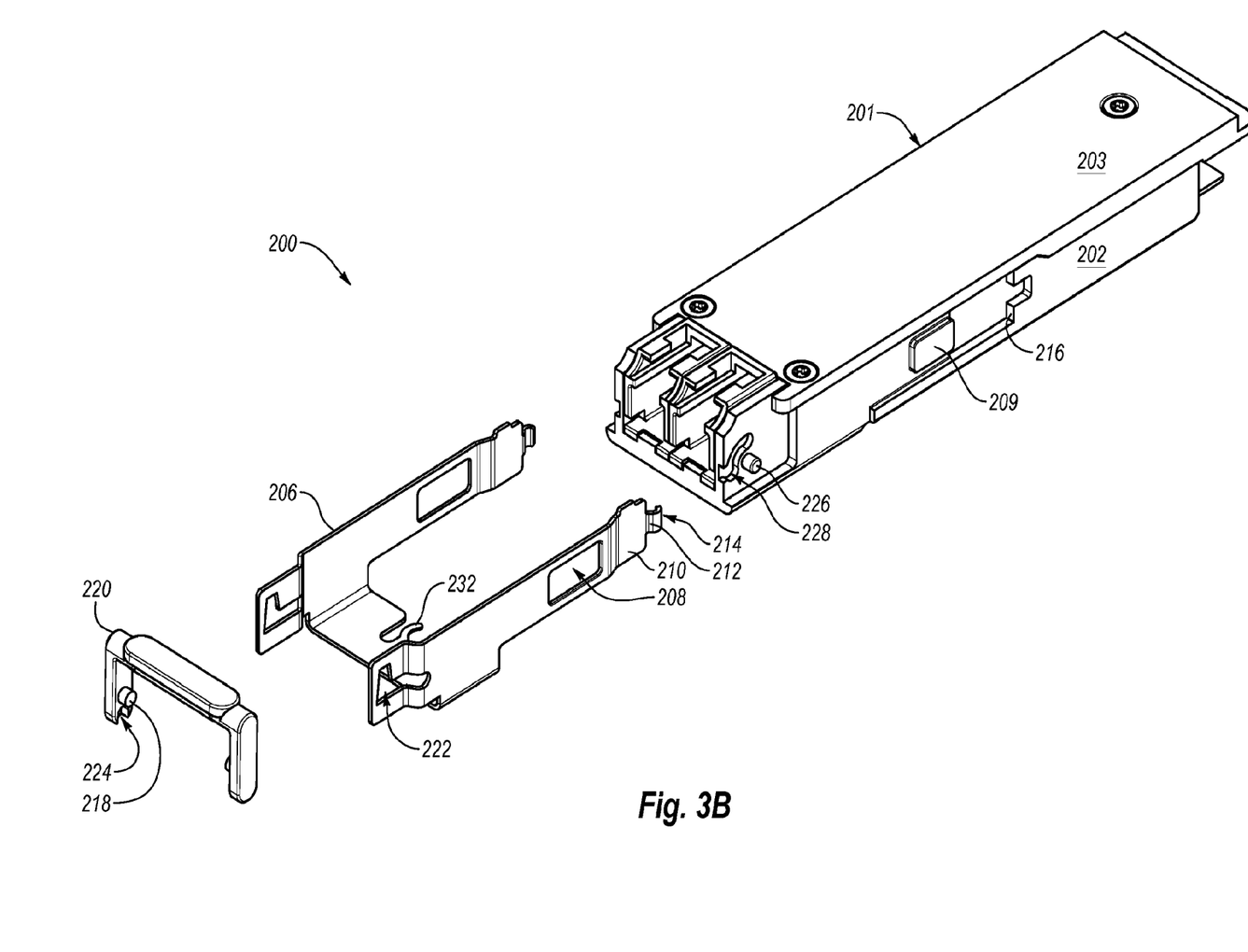
FIG. 3B is an exploded top perspective view of the example optoelectronic module of FIG. 3A.
Figure 3C:
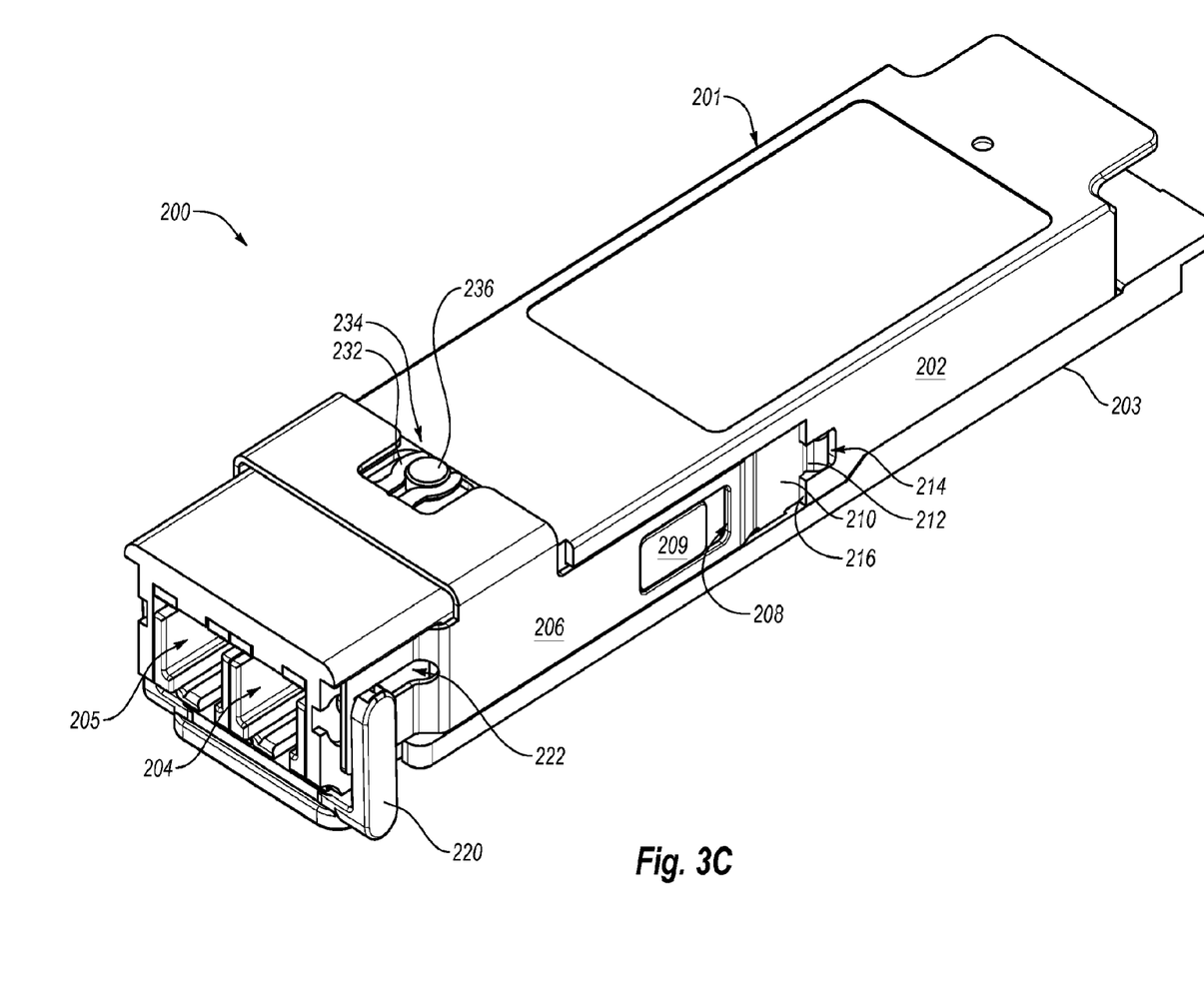
FIG. 3C is a bottom perspective view of the example optoelectronic module of FIG. 3A in the latched configuration.
Figure 3D:
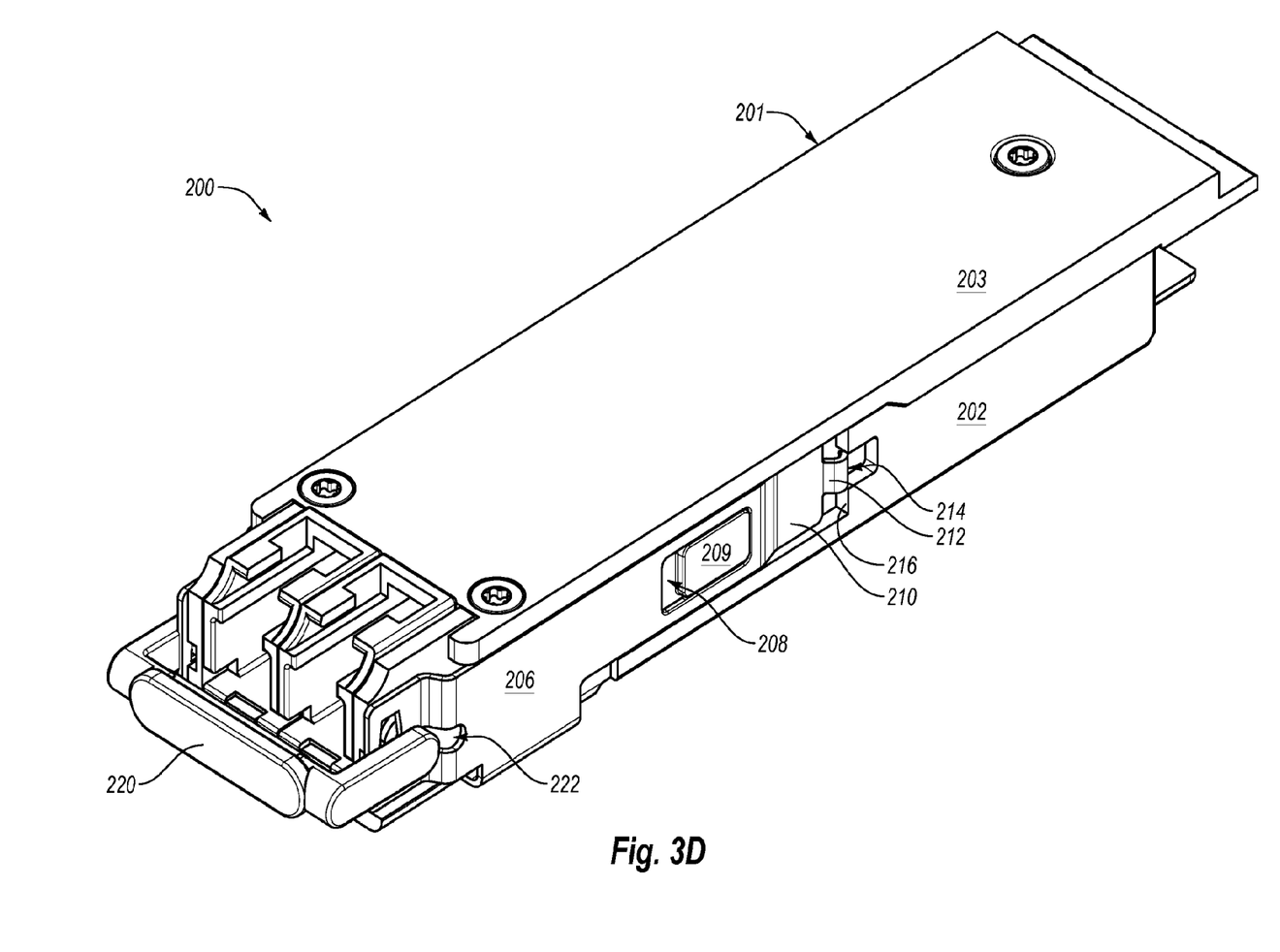
FIG. 3D is a top perspective view of the example optoelectronic module of FIG. 3A in the unlatched configuration.
Figure 3E:
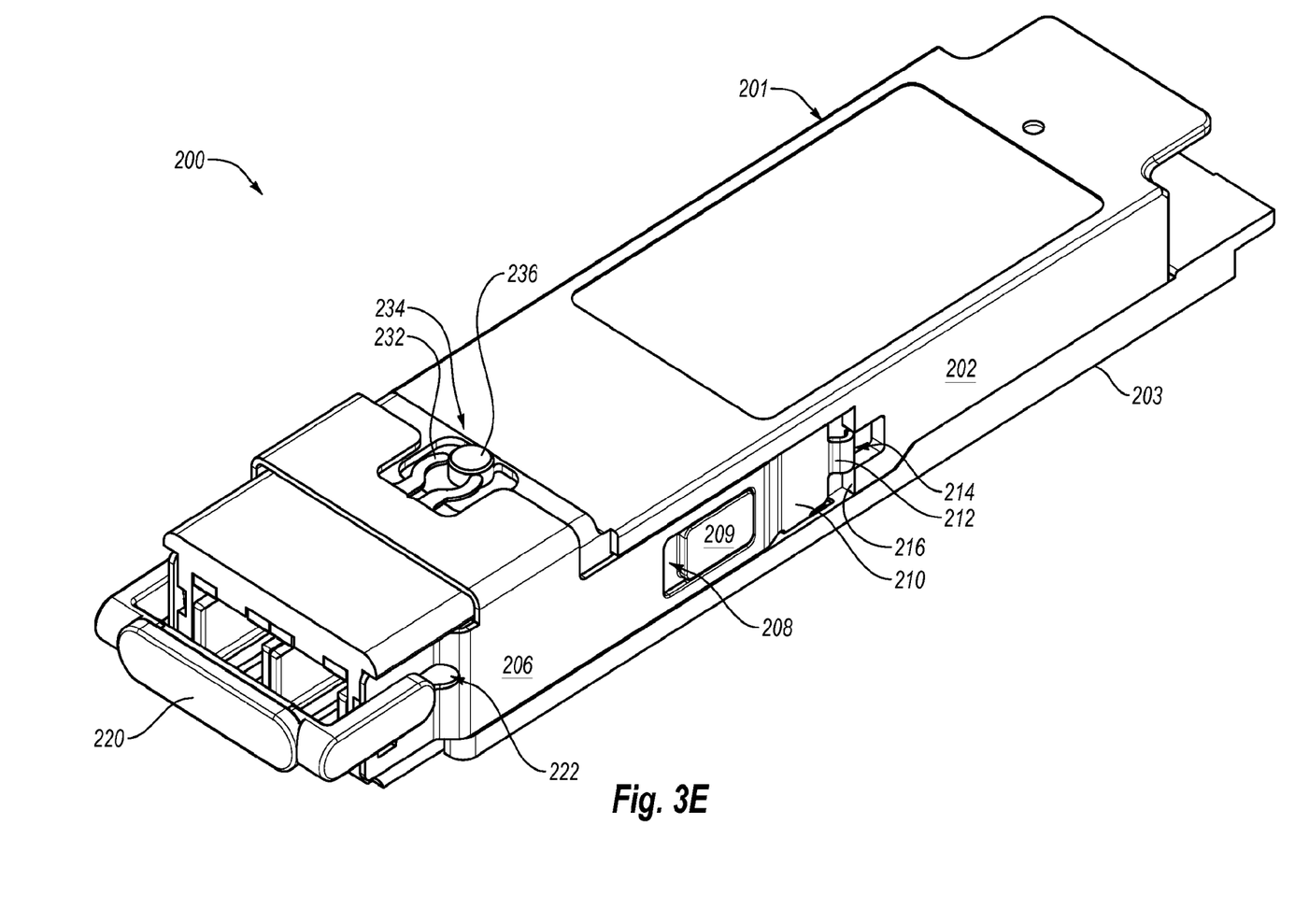
FIG. 3E is a bottom perspective view of the example optoelectronic module of FIG. 3A in the unlatched configuration

FIG. 3B is an exploded top perspective view of the example optoelectronic module 200 of FIG. 3A. The driver 220 is configured to be rotatingly positioned relative to the housing 201. As illustrated, in some embodiments, the driver 220 may include indentations 224 configured to couple with protrusions 226 on the housing 201 such that the driver 220 may be rotatingly positioned relative to the housing 201. The driver 220 may further include interfacing protrusions 218 configured to fit though interfacing openings 222 of the follower 206. In some embodiments, the interfacing protrusions 218 may be further configured to be slidingly received in slots 228 of the housing 201. The slots 228 may be shaped to contain the interfacing protrusions 218 as the driver 220 is rotated between the latched and unlatched positions. The slots 228 may be configured to encourage the indentations 224 to remain coupled with the protrusions 226, potentially preventing the driver 220 from being unintentionally detached from the housing 201.

The surfaces of the interfacing openings 222 are shaped to engage interfacing protrusions 218 of the follower 206 such that the follower 206 is urged towards a second position relative to the housing 201 (as shown in FIG. 3D) as the driver 220 is rotated from a latched position to an unlatched position. The surfaces of the interfacing openings 222 are further shaped to engage the interfacing protrusions 218 such that the follower 206 is urged towards the first position relative to the housing 201 (as shown in FIG. 3A) as the driver 220 is rotated from the unlatched position to the latched position. The interfacing protrusions 218 may generally slide against the corresponding surfaces of the interfacing openings 222 during rotation of the driver 220 in order to cause sliding of the follower 206 relative to the housing 201. The interfacing openings 222 may be further configured to slide along the protrusions 226 to allow the follower 206 to slide along the housing 201 as the driver 220 is rotated between the latched and unlatched configurations.

During assembly, the interfacing protrusions 218 of the driver 220 may be inserted into the interfacing openings 222 of the follower 206. In some embodiments, the driver 220 and/or follower 206 may be resiliently deformed to allow the interfacing protrusions 218 to be inserted into the interfacing openings 222. Also during assembly, the follower 206 may be resiliently deformed to allow the follower arms to be positioned on the housing 201. In embodiments that include EMI protrusions 209 and EMI windows 208, the follower 206 may be resiliently deformed to allow the EMI protrusions 209 to be positioned within the EMI windows 208. Furthermore, during assembly the interfacing protrusions 218 may be positioned within the slots 228 of the housing 201 and the protrusions 226 of the housing 201 may be positioned within the indentations 224 of the driver 220.

FIG. 3C is a bottom perspective view of the example optoelectronic module 200 of FIG. 3A in the latched configuration. As shown in FIG. 3C, the optoelectronic module 200 may include a fastening mechanism 234. The fastening mechanism 234 may include a first portion located on the follower 206 and a second portion located on the housing 201. As illustrated, the fastening mechanism 234 may include resilient members 232 and a fastener protrusion 236. The resilient members 232 and the fastener protrusion 236 may facilitate selective engagement of the follower 206 and the housing 201. As disclosed in FIG. 3C, the resilient members 232 may urge the follower 206 towards a first position relative to the housing 201 when the follower 206 is at or near its latched position. Put another way, the shape of the resilient members 232 and fastener protrusion 236, and the resiliency of the resilient members 232 may cause the follower 206 and, consequentially, the driver 220 to be encouraged into the latched configuration as the optoelectronic module 200 nears the latched configuration from the unlatched configuration. The shapes of the resilient members 232 and fastener protrusion 236, and the resiliency of the resilient members 232 may also provide resistance that may be overcome to move the driver 220 and follower 206 from the latched configuration to the unlatched configuration.

Although the fastening mechanism 234 is shown as having resilient members 232 that selectively engage a fastener protrusion 236, other fastening mechanism 234 configurations may be used. For example, in some embodiments, resilient members 232 may be located on the housing 201 and may selectively engage a protrusion on the follower 206. Alternately or additionally, resilient members 232 on the housing 201 or follower 206 may selectively engage indentations, openings, other resilient members 232, and the like on the follower 206 or housing 201.

FIGS. 3D and 3E are a top perspective view and a bottom perspective view, respectively, of the example optoelectronic module 200 of FIG. 3A in an unlatched configuration. To extract the optoelectronic module 200 from a host device cage such as the cage shown in FIG. 1, the driver 220 is generally rotated from the latched position (shown in FIGS. 1, 3A, and 3C) to the unlatched position (shown in FIGS. 3D and 3E). As disclosed in FIGS. 3D and 3E, as the driver 220 is rotated to the unlatched position, biasing forces generated by the fastening mechanism 234 are overcome, and the follower 206 slides relative to the housing 201.

As disclosed in FIG. 3E, the resilient members 232 may urge the follower 206 towards a second position relative to the housing 201 when the follower 206 is at or near its unlatched position. Put another way, the shape of the resilient members 232 and fastener protrusion 236, and the resiliency of the resilient members 232 may cause the follower 206 and, consequentially, the driver 220 to be encouraged into their unlatched positions as the optoelectronic module 200 nears the unlatched configuration from the latched configuration. The shapes of the resilient members 232 and fastener protrusion 236, and the resiliency of the resilient members 232 may also provide resistance that may be overcome to move the driver 220 and follower 206 from their unlatched positions to their latched positions.

The sliding of the follower 206 causes the leaf springs of the cage to slide along ramped surfaces 212, urging the leaf springs away from the center of the cage until they are located on the fingers 214. The configuration of the fingers 214 causes the leaf springs to no longer abut the shoulders 216, thus allowing the optoelectronic module 200 to be removed from the cage unhindered by the leaf springs.

As disclosed in FIGS. 3D and 3E, the EMI protrusion 209 may stop the sliding progress of the follower 206 in the unlatched position. Stopping the sliding progress of the follower 206 may prevent the follower 206 from coming off the optoelectronic module 200 housing. Stopping the progress of the follower 206 may also stop the progress of the driver 220 at the unlatched position.

Figure 4A:
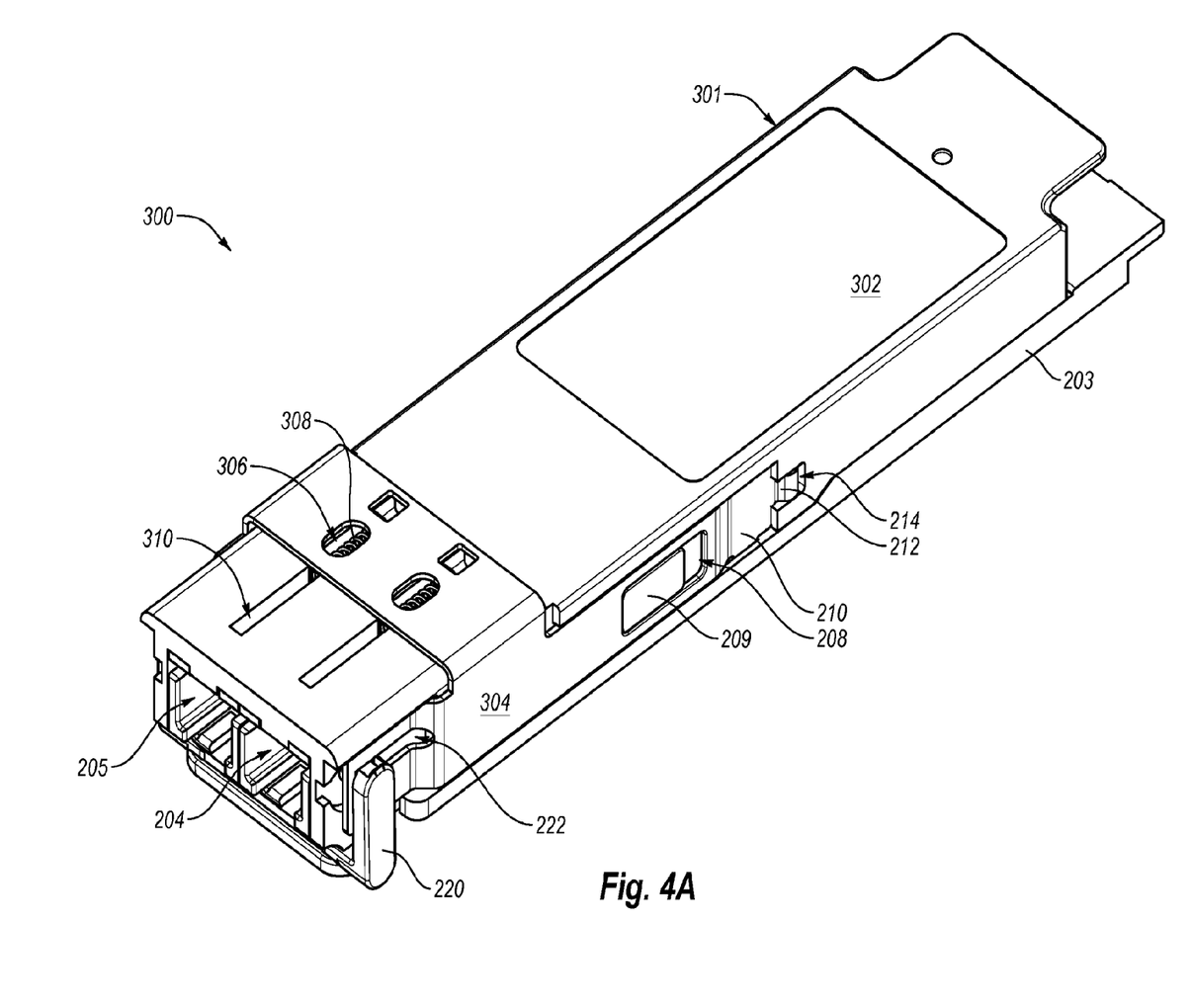
FIG. 4A is a bottom perspective view of another example embodiment of an optoelectronic module.
Figure 4B:
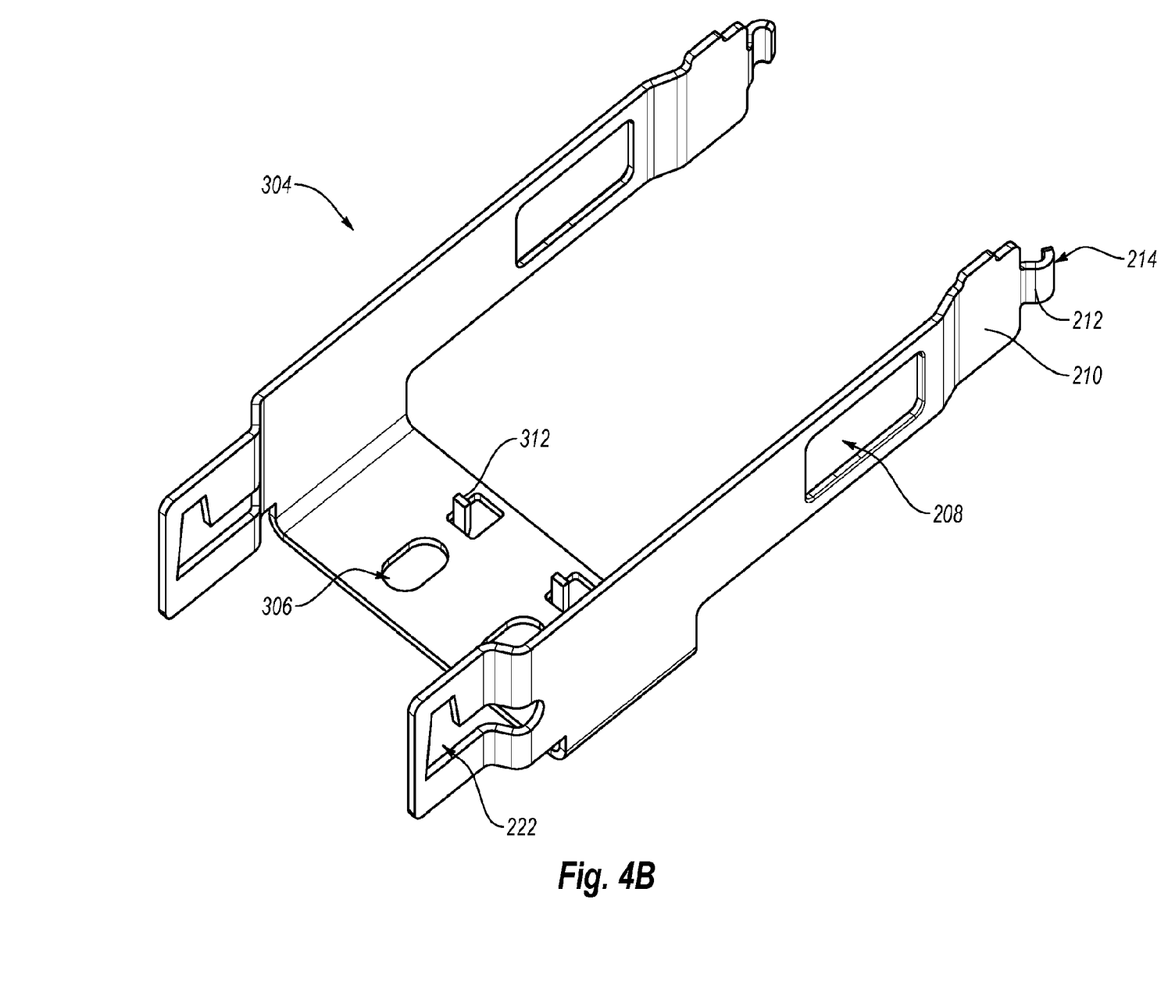
FIG. 4B is a top perspective view of the follower from the example optoelectronic module of FIG. 4A.
Figure 4C:
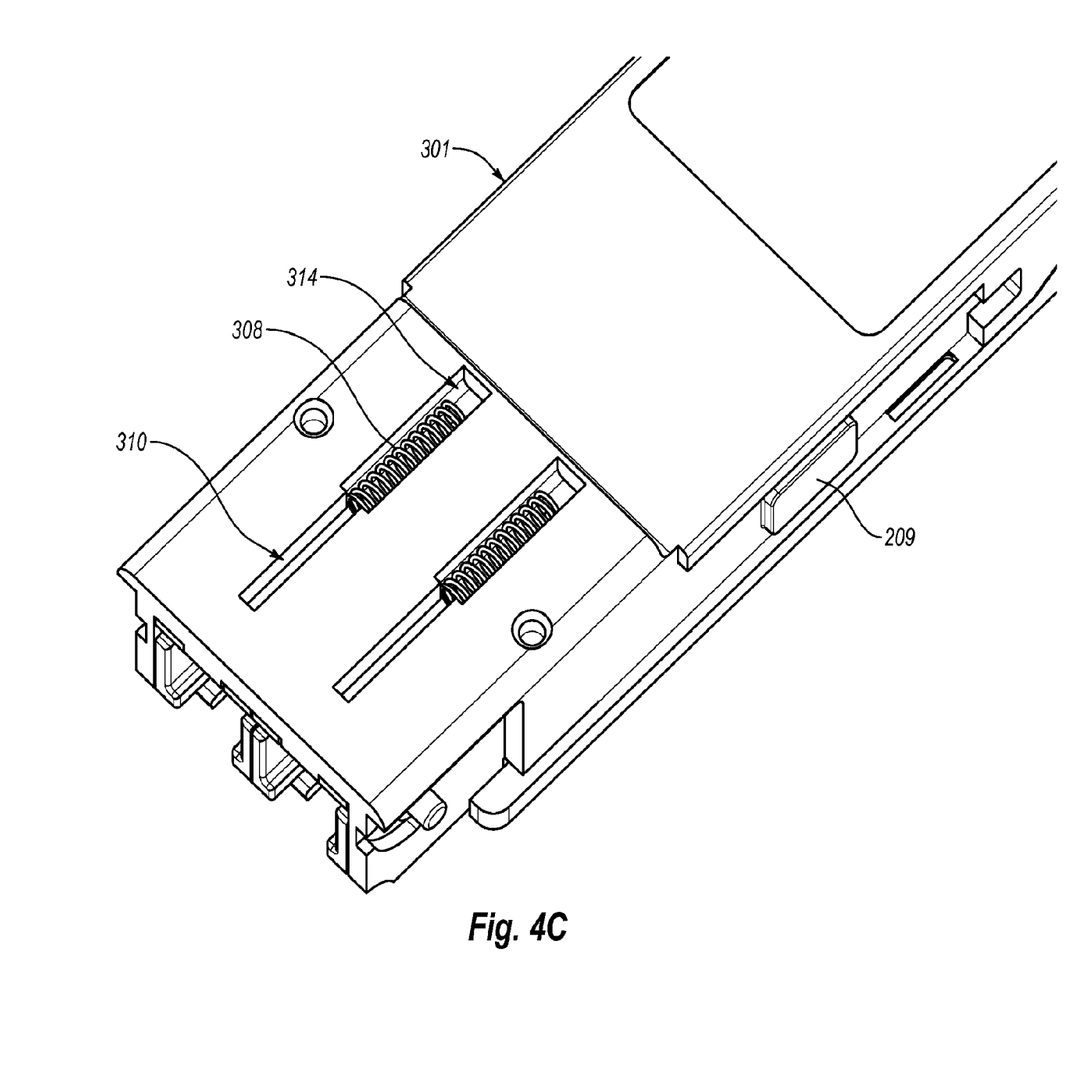
FIG. 4C is a close-up bottom perspective view of a portion of the optoelectronic module of FIG. 4A with the follower of FIG. 4B omitted.

FIGS. 4A-4C disclose another example embodiment of an optoelectronic module 300. The optoelectronic module 300 may selectively engage a host device cage in a manner similar to the optoelectronic module 200 of FIGS. 1 and 3A-3E. In the embodiment disclosed in FIGS. 4A-4C, the optoelectronic module 300 includes one or more resilient members, such as springs 308, configured to urge a follower 304 and driver 220 toward a latched configuration. Some embodiments may further include a fastening mechanism generally corresponding to the fastening mechanism 234 disclosed in FIGS. 3A-3E.

FIG. 4A is a bottom perspective view of the optoelectronic module 300. As disclosed in FIG. 4A, the optoelectronic module 300 includes a housing 301 that may include a bottom housing 302 and a top housing 203. The optoelectronic module 300 also includes the follower 304. Similar to the follower 206 of FIGS. 3A-3E, the follower 304 is configured to be slidingly positioned relative to the housing 301. The follower 304 is shown in a first position relative to the housing 301.

FIG. 4B is a top perspective view of the follower 304 and FIG. 4C is a close-up bottom perspective view of the optoelectronic module 300 with the follower 304 and driver 220 omitted. With reference to FIG. 4B, the follower 304 may include accesses 306 and engaging members 312. With reference to FIGS. 4B and 4C, the engaging members 312 may be configured to be slidingly received within channels 314 of the housing 301. Springs 308 may be positioned in the channels 314 between the engaging members 312 and the housing 301 such that the springs 308 urge the follower 304 toward the first position. For example, as disclosed in FIG. 4A, the springs 308 may be resiliently compressed when the follower 304 is in the first position, and thus may urge the follower 304 toward the first position to promote the follower 304 and driver 220 to stay securely in the latched position until the driver 220 is purposefully rotated. As the follower 304 is urged toward a second position by rotating the driver 220, the force exerted by the springs 308 is overcome, causing the springs 308 to compress further and continue to urge the follower 304 toward the first position. Although helical compression springs 308 are disclosed in FIGS. 4A and 4C, it will be appreciated that other elastic materials and/or devices may be used.

In some embodiments, the bottom housing 302 may include assembly slots 310. During assembly, the engaging members 312 may be inserted into the assembly slots 310 such that the follower 304 may be slid into an assembled position on the housing 301. In embodiments that include EMI protrusions 209 and EMI windows 208, the follower 304 may be temporarily resiliently deformed to allow the EMI windows 208 to be positioned around the EMI protrusions 209. In some embodiments, the springs 308 may be positioned in the channels 314 by way of the access 306.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A module latch mechanism comprising:
a follower having a first arm and a second arm;
a cross-piece that couples the first arm to the second arm, the cross-piece including a first portion of a fastening mechanism that facilitates selective engagement of the follower with a housing; and
a driver positioned relative to the follower such that the driver urges the follower toward a first position relative to the housing as the driver moves from a first engagement position to a second engagement position;
wherein the first arm defines an opening through which an electromagnetic interference (EMI) protrusion of the housing extends, and the EMI protrusion is not included as part of the first arm, and the opening including a first bound and a second bound in a Z axis of the first arm and an upper bound and a lower bound in a Y axis of the first arm, and a size of the opening is oversized compared to the EMI protrusion to permit the follower to move within a permissible range with respect to the housing restricted by the first bound, the second bound, the upper bound, and the lower bound of the opening while the EMI protrusion remains within the opening, and the opening is located completely within the first arm such that the EMI protrusion is surrounded by the first arm within the opening.

2. The module latch mechanism of claim 1, wherein the first portion of the fastening mechanism comprises a resilient fastener.

3. The module latch mechanism of claim 2, wherein:
the resilient fastener includes two resilient members,
a second portion of the fastening mechanism includes a fastener protrusion located on the housing, and
the two resilient members are configured to selectively engage the fastener protrusion.

4. The module latch mechanism of claim 1, wherein:
the driver is further configured to be positioned relative to the follower such that the driver urges the follower toward a second position relative to the housing as the driver moves from the second engagement position to the first engagement position, and
the fastening mechanism is further configured to urge the follower toward the first position when the follower is closer to the first position than the second position.

5. The module latch mechanism of claim 1, wherein:
the driver is further configured to be positioned relative to the follower such that the driver urges the follower toward a second position relative to the housing as the driver moves from the second engagement position to the first engagement position, and
the fastening mechanism is further configured to urge the follower toward the second position when the follower is closer to the second position than the first position.

6. The module latch mechanism of claim 1, wherein:
the driver is further configured to be positioned relative to the follower such that the driver urges the follower toward a second position relative to the housing as the driver moves from the second engagement position to the first engagement position, and
the fastening mechanism is further configured to:
urge the module latch mechanism toward a first position when the driver is in the first engagement position, and
urge the module latch mechanism toward a second position when the driver is in the second engagement position.

7. The module latch mechanism of claim 1, wherein the fastening mechanism is configured to engage the follower and the housing when the housing and a host device are engaged.

8. The module latch mechanism of claim 1, wherein the first arm is configured to facilitate contact between the housing and an EMI finger located on a host device.

9. The module latch mechanism of claim 1, wherein the EMI protrusion is allowed to make contact with an EMI finger located on a host device.

10. The module latch mechanism of claim 1, wherein the driver is configured to be positioned relative to a pair of axially-aligned protrusions located on the housing.

11. The module latch mechanism of claim 1, wherein the driver includes a driver protrusion configured to be received by an opening formed in the follower.

12. The module latch mechanism of claim 11, wherein the driver protrusion is further configured to be received by a slot formed in the housing.

13. An optoelectronic module including the module latch mechanism of claim 1.

14. A module comprising:
a housing including at least one electromagnetic interference (EMI) protrusion that contacts at least a portion of an EMI shield located on a host device; and
a module latch mechanism including:
a follower positioned relative to the housing and having a pair of arms, wherein:
the pair of arms facilitate selective engagement of the housing with the host device, at least in part by way of temporary deformation of structure of the host device;
at least one arm of the pair of arms defines an opening through which the at least one EMI protrusion extends;
the at least one EMI protrusion is not included as part of either of the pair of arms;
a size of the opening is oversized compared to the at least one EMI protrusion to permit the follower to move within a permissible range with respect to the housing while the at least one EMI protrusion remains within the opening; and the opening is located completely within the at least one arm of the pair of arms such that the at least one EMI protrusion is surrounded by the at least one arm of the pair of arms within the opening;

a cross-piece that couples the pair of arms, wherein the cross-piece includes a first portion of a fastening mechanism that facilitates selective engagement of the follower with the housing, wherein:

the first portion of the fastening mechanism comprises a resilient fastener;

a second portion of the fastening mechanism includes a fastener protrusion located on the housing; and the resilient fastener is configured to selectively engage the fastener protrusion and a driver positioned relative to the housing, and positioned relative to the follower such that:

the driver urges the follower toward a first position relative to the housing as the driver moves from a first engagement position to a second engagement position; and the driver urges the follower toward a second position relative to the housing as the driver moves from the second engagement position to the first engagement position.

15. The module of claim 14, wherein the follower is movable relative to the housing and the at least one EMI protrusion in a first direction perpendicular to a second direction in which the at least one EMI protrusion extends through the opening.

16. The module of claim 14, wherein:

the resilient fastener includes two resilient members; and the fastening mechanism urges the module latch mechanism toward a first position when the housing is engaged with the host device.

17. A module comprising:

a housing that includes at least one electromagnetic interference (EMI) protrusion that contacts at least a portion of an EMI shield located on a host device; and a module latch mechanism including:

a follower positioned relative to the housing, the follower including:

a pair of arms that facilitate selective engagement of the housing with the host device, at least in part, by way of temporary deformation of structure of the host device; wherein:

at least one arm of the pair of arms defines an opening through which the at least one EMI protrusion extends;

the at least one EMI protrusion is not included as part of either of the pair of arms;

the opening including a first bound and a second bound in a Z axis of the at least one arm and an upper bound and a lower bound in a Y axis of the at least one arm, a size of the opening is oversized compared to the at least one EMI protrusion to permit the follower to move within a permissible range with respect to the housing restricted by the first bound, the second bound, the upper bound, and the lower bound of the opening while the at least one EMI protrusion remains within the opening; and the opening is located completely within the at least one arm of the pair of arms such that the at least one EMI protrusion is surrounded by the at least one arm of the pair of arms within the opening;

a cross-piece that couples the pair of arms, wherein the cross-piece includes a first portion of a fastening mechanism that facilitates selective engagement of the follower with the housing and comprises a resilient fastener, the fastening mechanism further includes a second portion positioned on the housing which includes a fastener protrusion located on the housing, wherein the resilient fastener is configured to selectively engage the fastener protrusion, and the fastening mechanism urges the module latch mechanism toward a first position when the housing is engaged with the host device; and a driver positioned relative to the housing, and positioned relative to the follower, such that:

the driver urges the follower toward a first position relative to the housing as the driver moves from a first engagement position to a second engagement position, and the driver urges the follower toward a second position relative to the housing as the driver moves from the second engagement position to the first engagement position.

18. The module of claim 17, wherein the first portion of the fastening mechanism includes a pair of resilient members that selectively engage the fastener protrusion.

19. The module of claim 17, wherein the at least the portion of the EMI shield located on the host device comprises at least one EMI finger of the EMI shield.

20. A module comprising:

a housing including a channel and at least one electromagnetic interference (EMI) protrusion that contacts at least a portion of an EMI shield located on a host device; and a module latch mechanism including:

a follower positioned relative to the housing, the follower including:

a cross-piece;

a pair of arms coupled together by the cross-piece, wherein;

the pair of arms facilitate selective engagement of the housing with the host device, at least one arm of the pair of arms defines an opening through which the at least one EMI protrusion extends;

the at least one EMI protrusion is not included as part of either of the pair of arms;

a size of the opening is oversized compared to the at least one EMI protrusion to permit the follower to move within a permissible range with response to the housing while the at least one EMI protrusion remains within the opening; and the opening is located completely within the at least one arm of the pair of arms such that the at least one EMI protrusion is completely circumscribed by the at least one arm of the pair of arms in a Z axis and a Y axis of the at least one arm of the pair of arms;

an engaging member that extends upward from the cross-piece;

a driver:

positioned relative to the housing, and positioned relative to the follower such that the driver urges the follower toward a second position relative to the housing as the driver moves from a second engagement position to a first engagement position; and a resilient member positioned at least partially within the channel, wherein the resilient member urges the follower towards a first position relative to the housing by way of the engaging member.

21. The module of claim 20, wherein the cross-piece of the follower further includes an access that allows the resilient member to be positioned at least partially within the channel when the follower is positioned relative to the housing.

\* \* \* \* \*